(12) United States Patent
Chang et al.

(10) Patent No.: US 8,599,924 B2
(45) Date of Patent: *Dec. 3, 2013

(54) METHOD OF STORING MOTION VECTOR INFORMATION AND VIDEO DECODING APPARATUS

(71) Applicant: MediaTek Inc., Hsin-Chu (TW)

(72) Inventors: Yung-Chang Chang, New Taipei (TW); Chih-Ming Wang, New Taipei (TW); Kun-Bin Lee, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,970

(22) Filed: Apr. 10, 2013

(65) Prior Publication Data

US 2013/0223512 A1 Aug. 29, 2013

Related U.S. Application Data

(63) Continuation of application No. 12/900,269, filed on Oct. 7, 2010.

(60) Provisional application No. 61/260,053, filed on Nov. 11, 2009.

(51) Int. Cl.
*H04N 7/12* (2006.01)

(52) U.S. Cl.
USPC .................................................. 375/240.16

(58) Field of Classification Search
USPC .................................................. 375/240.16
See application file for complete search history.

(56) References Cited

U.S. PATENT DOCUMENTS

| | | | |
|---|---|---|---|
| 6,011,587 A | 1/2000 | Sakazawa et al. | |
| 7,499,493 B2 | 3/2009 | Linzer | |
| 7,558,321 B2 | 7/2009 | Jeon | |
| 7,813,429 B2 * | 10/2010 | Winger | 375/240.16 |
| 8,270,492 B2 * | 9/2012 | Ikeda et al. | 375/240.16 |
| 8,379,722 B2 * | 2/2013 | Tourapis et al. | 375/240.16 |
| 2004/0066848 A1 | 4/2004 | Jeon | |
| 2004/0258153 A1 | 12/2004 | Linzer | |
| 2005/0129129 A1 * | 6/2005 | Winger et al. | 375/240.24 |
| 2006/0083311 A1 | 4/2006 | Winger | |
| 2007/0076795 A1 * | 4/2007 | Lee | 375/240.16 |

FOREIGN PATENT DOCUMENTS

| | | |
|---|---|---|
| CN | 1487748 | 4/2004 |
| CN | 101394559 | 6/2009 |

\* cited by examiner

*Primary Examiner* — Jay Patel
*Assistant Examiner* — Jessica Prince
(74) *Attorney, Agent, or Firm* — McClure, Qualey & Rodack, LLP (57) ABSTRACT

A video decoding apparatus includes a bitstream parser, a calculator and a memory. The bitstream parser is provided to receive a video bitstream and extracting a set of constraints associated with the video bitstream, wherein the set of constraints has information associated with a direct_8×8_inference flag for a macroblock of a picture, wherein the macroblock has N sub-macroblock partitions. The calculator is provided to calculate first motion vector information associated with the macroblock and obtain second motion vector information associated with K of the N sub-macroblock partitions from the first motion vector information according to the information associated with the direct_8×8_inference flag, wherein K is less than N. The memory is provided to store the second motion vector information.

6 Claims, 8 Drawing Sheets

| 202A | 202B | 202C | 202D |
|------|------|------|------|
| 202E | 202F | 202G | 202H |
| 202I | 202J | 202K | 202L |
| 202M | 202N | 202O | 202P |

| Level | MaxVmvR | MaxMvsPer2Mb |
|---|---|---|
| 1 | [-64,+63.75] | - |
| 1b | [-64,+63.75] | - |
| 1.1 | [-128,+127.75] | - |
| 1.2 | [-128,+127.75] | - |
| 1.3 | [-128,+127.75] | - |
| 2 | [-128,+127.75] | - |
| 2.1 | [-256,+255.75] | - |
| 2.2 | [-256,+255.75] | - |
| 3 | [-256,+255.75] | 32 |
| 3.1 | [-512,+511.75] | 16 |
| 3.2 | [-512,+511.75] | 16 |
| 4 | [-512,+511.75] | 16 |
| 4.1 | [-512,+511.75] | 16 |
| 4.2 | [-512,+511.75] | 16 |
| 5 | [-512,+511.75] | 16 |
| 5.1 | [-512,+511.75] | 16 |

METHOD OF STORING MOTION VECTOR INFORMATION AND VIDEO DECODING APPARATUS

CROSS REFERENCE TO RELATED APPLICATIONS

This application is a continuation of co-pending patent application Ser. No. 12/900,269, filed Oct. 7, 2010, which claims priority of U.S. Provisional Application Ser. No. 61/260,053 filed on Nov. 11, 2009, the entirety of which is incorporated by reference herein.

BACKGROUND

1. Field

The disclosed embodiments relate to video decoding, and more particularly relate to a method of storing motion vector information and a video decoding apparatus using the method capable of reducing memory requirement for storing motion vector information.

2. Description of the Related Art

As consumer demand for multimedia entertainment and information, as well as the desire for higher display quality have increased, requirement for processing, transmission and storage resources for video content, such as memory size and bandwidth, have also increased. A number of standards have been developed to assure the display quality of the video content while achieving considerable improvements in compression and decompression efficiency, such as the International Telecommunication Union, Telecommunication Sector (ITU-T) H.264 recommendation (hereinafter the "ITU-T H.264 standard").

The ITU-T H.264 standard is a block-based video codec standard capable of providing an enhanced compression ratio of the video content without significantly sacrificing video quality. As for the ITU-T H.264 standard, intra-frame and inter-frame prediction are introduced to remove spatial correlations in the current picture and temporal redundancies between successive video pictures. There is an inter-frame prediction mode called Direct mode which is utilized the motion vector information of the other video pictures, so as to generate a standard compliant compressed bitstream.

Although the ITU-T H.264 standard specifies the representation of the standard compliant compressed bitstream and the method of decoding, there is some latitude for improving memory storage capacity and transmission bandwidth. For example, due to higher display quality with increasing resolutions or faster frame rates, the motion vector information of earlier video pictures retained for decoding later video pictures may unfavorably consume more storage space and transmission bandwidth, as well as degrade decoding efficiency.

Accordingly, there is a need for techniques that allow a video decoding apparatus to reduce unnecessary motion vector information according to the syntax information of the compressed bitstream.

BRIEF SUMMARY

An embodiment of a method of storing motion vector information includes the steps of: receiving a video bitstream; extracting a set of constraints associated with the video bitstream, wherein the set of constraints has information associated with a direct_8×8_inference flag for a macroblock of a picture, wherein the macroblock has N sub-macroblock partitions; calculating first motion vector information associated with the N sub-macroblock partitions; obtaining second motion vector information associated with K of the N sub-macroblock partitions from the first motion vector information according to the information associated with the direct_8×8_inference flag, and storing the second motion vector information, wherein K is less than N.

Further, an embodiment of a video decoding apparatus includes a bitstream parser, a calculator and a memory. The bitstream parser is provided to receive a video bitstream and extracting a set of constraints associated with the video bitstream, wherein the set of constraints has information associated with a direct_8×8_inference flag for a macroblock of a picture, wherein the macroblock has N sub-macroblock partitions. The calculator is provided to calculate first motion vector information associated with the N sub-macroblock partitions and obtain second motion vector information associated with K of the N sub-macroblock partitions from the first motion vector information according to the information associated with the direct_8×8_inference flag, wherein K is less than N. The memory is provided to store the second motion vector information.

Further, an embodiment of a method of storing motion vector information includes the steps of: receiving a video bitstream; calculating motion vector information associated with a current macroblock of a first picture in the video bitstream; determining whether the motion vector information associated with the current macroblock has motion vector data referring to a reference picture list 0 or a reference picture list 1; if the current macroblock does not have the motion vector data referring to the reference picture list 0 and the reference picture list 1, storing the zero-valued motion vector data associated with the current macroblock; if the current macroblock has the motion vector data referring to the reference picture list 0, storing the motion vector data referring to the reference picture list 0; and else storing the motion vector data referring to the reference picture list 1. The stored motion vector data is used for a direct prediction mode macroblock of the later pictures in the video bitstream.

Further, another embodiment of a video decoding apparatus includes a bitstream parser, a calculator and a memory. The bitstream parser is provided to receive a video bitstream. The calculator is provided to calculate motion vector information associated with a current macroblock of a first picture in the video bitstream, and determine whether the motion vector information associated with the current macroblock has motion vector data referring to a reference picture list 0 or a reference picture list 1. If the current macroblock does not have the motion vector data referring to the reference picture list 0 and the reference picture list 1, the calculator stores the zero-valued motion vector data associated with the current macroblock. If the current macroblock has the motion vector data referring to the reference picture list 0, the calculator stores the motion vector data referring to the reference picture list 0; and else stores the motion vector data referring to the reference picture list 1. The stored motion vector data is used for a direct prediction mode macroblock of the later pictures in the video bitstream.

Further, another embodiment of a method of includes the steps of: receiving a video bitstream; extracting a set of constraints associated with the video bitstream, wherein the set of constraints comprises a target resolution level and a maximum number of motion vectors required to be stored for two consecutive macroblocks of a picture; and allocating a first memory with a first memory size for storing motion vector information associated with marcoblocks within one picture according to the target resolution level, wherein the first memory size is smaller than a second memory size calculated according to a total number of the marcoblocks and the maximum number of motion vectors required to be stored for two consecutive macroblocks.

Further, another embodiment of a video decoding apparatus includes a bitstream parser, a calculator and a memory. The bitstream parser is provided to receive a video bitstream and extract a set of constraints associated with the video bitstream, wherein the set of constraints comprises a target resolution level and a maximum number of motion vectors required to be stored for two consecutive macroblocks of a picture. The calculator is provided to allocate a first memory with a first memory size in the memory for storing motion vector information associated with marcoblocks within one picture according to the target resolution level, wherein the first memory size is smaller than a second memory size calculated according to the maximum number of motion vectors required to be stored for two consecutive macroblocks.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
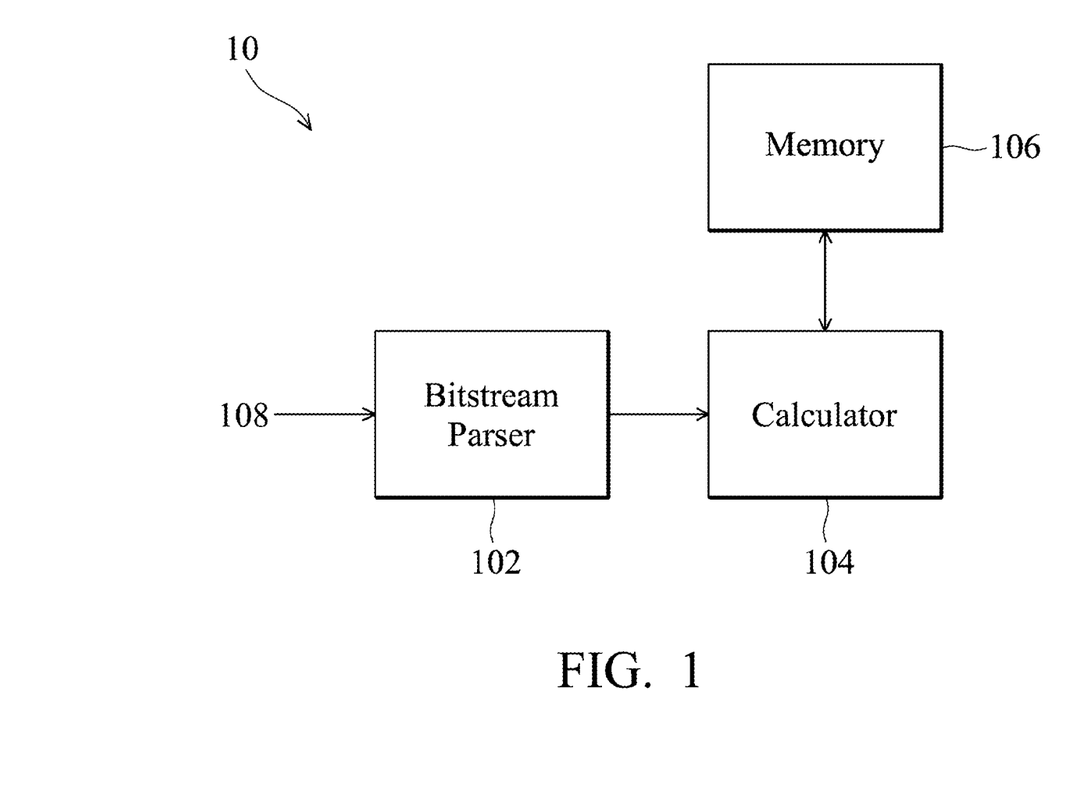
FIG. 1 is a block diagram illustrating an embodiment of a video processing apparatus.

FIG. 1 is a block diagram illustrating an embodiment of a video decoding apparatus 10.

As shown in FIG. 1, the video decoding apparatus 10 includes a bitstream parser 102, a calculator 104 and a memory 106. The bitstream parser 102 is provided to receive a video bitstream 108, which is compliant with the ITU-T H.264 standard. Further, the bitstream parser 102 extracts a set of constraints i.e., a sequence parameter set (SPS), associated with the video bitstream 108. The sequence parameter set indicates information about encoding of the video bitstream 108, such as an encoding mode, a level indication (i.e., a target resolution level) or a profile, but is not limited thereto. It is noted that the set of constraints is defined in the header information of the video bitstream 108.

Figure 2:
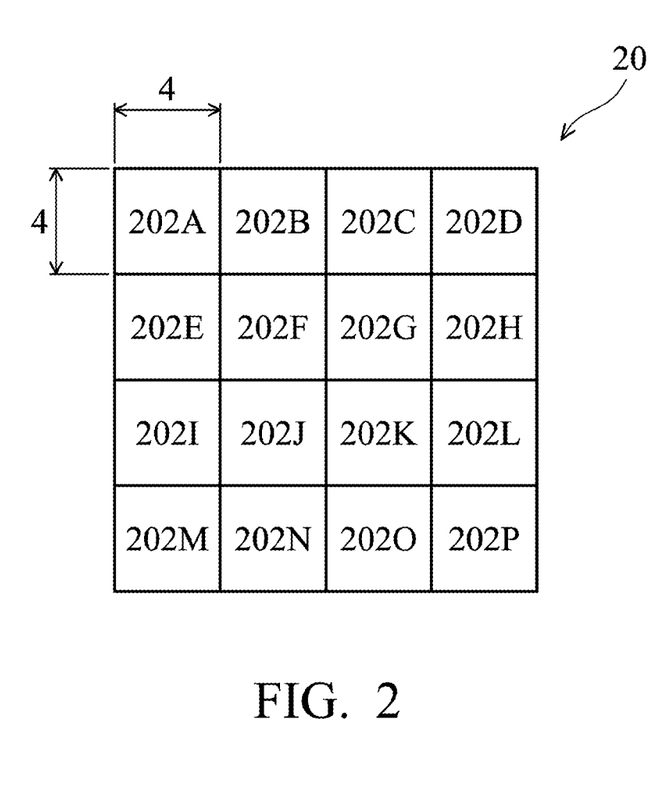
FIG. 2 is a diagram illustrating a macroblock of a picture included in a video bitstream.

FIG. 2 is a diagram illustrating a macroblock 20 of a picture included in the video bitstream 108. Referring to FIGS. 1 and 2, the calculator 104 coupled to the bitstream parser 102 is provided for calculating the motion vector information associated with the macroblock 20. Generally, a variety of combinations of partitions and sub-macroblock partitions are available in each macroblock. For example, the macroblock 20 shown in FIG. 2 is partitioned into sixteen 4×4 sub-macroblock partitions, such as 202A, 202B, 202C . . . 202N, 202O and 202P, but is not limited thereto. In some embodiments, the marcoblock 20 can also be partitioned into two 16×8 sub-macroblock partitions, two 8×16 sub-macroblock partitions, four 8×8 sub-macroblock partitions, eight 8×4 sub-macroblock partitions, or eight 4×8 sub-macroblock partitions.

In addition, macroblocks can be divided into intra-frame prediction macroblocks and inter-frame prediction macroblocks, according to ITU-T H.264 standard. The intra-frame prediction macroblocks are encoded without referring to a preceding decoded picture. On the contrary, the inter-frame prediction marcoblocks are encoded by referring to the preceding decoded reference pictures. An inter-frame prediction mode called direct prediction mode is utilized to encode/decode a macroblock of a picture, in which this macroblock has no motion vector information transmitted in the bitstreams. Specifically, the direct prediction mode macroblock in this picture is encoded/decoded using the motion vector information of a co-located marcoblock in another picture.

Furthermore, according to the ITU-T H.264 standard, a bi-direction prediction slice (called "B slice" hereinafter) is characterized in having intra-frame prediction macroblock(s) encoded without referring to a preceding picture and inter-frame prediction macroblock(s) encoded by referring to the preceding decoded reference pictures for improving coding efficiency. For example, the inter-frame prediction macroblock(s) can be divided into list 0 prediction mode macroblock(s), list 1 prediction mode macroblock(s), bi-predictive mode macroblock(s), and direct prediction mode macroblock(s), but are not limited thereto. In the direct prediction mode, the motion vector information associated with a current macroblock (i.e., a direct prediction mode macroblock) of the B slice may be inferred from the motion vector information associated with a co-located macroblock in a neighboring picture of the reference picture list 1. For the intra-frame mode macroblock(s), no motion vector information may be inferred from the co-located macroblock in a neighboring picture of the reference picture list 1. As such, this method is advantageous in that memory size and bandwith for the motion vector information can be reduced. The process of reducing required memory storage capacity for storing the motion vector information is described in more detail in the following description.

Figure 3:
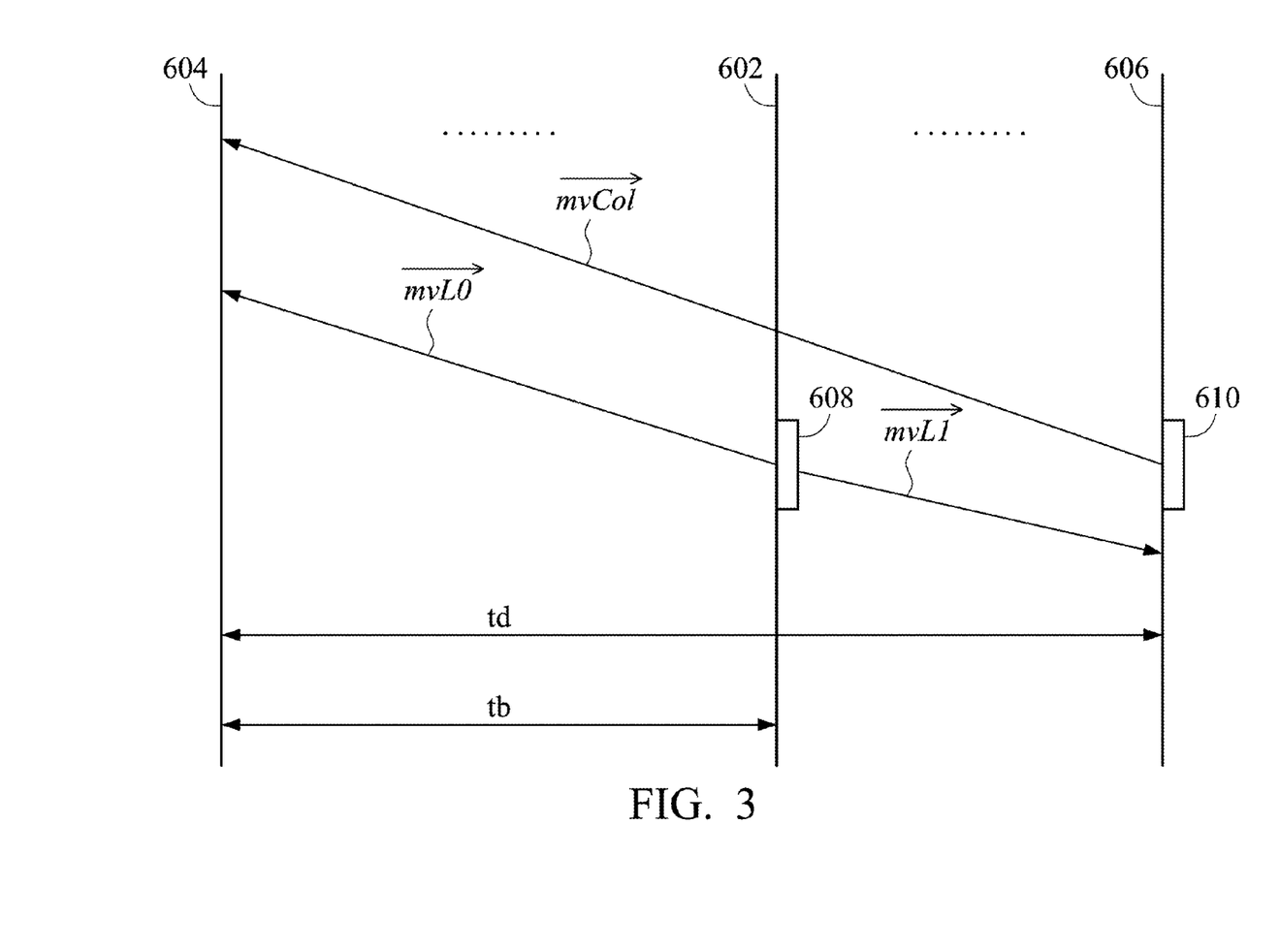
FIG. 3 is a diagram illustrating a B picture having a direct prediction mode macroblock.

FIG. 3 is a diagram illustrating a B slice having a direct prediction mode macroblock. Referring to FIGS. 1 and 3, a direct prediction mode macroblock 608 in a B slice of a picture 602 included in the video bitstream 108 may be predicted using two motion vectors $\overrightarrow{mvL0}$ and $\overrightarrow{mvL1}$ pointing to different reference pictures 604 and 606 that are assigned to two different reference picture lists (i.e., reference picture list 0 and reference picture list 1). During operation, the two motion vectors $\overrightarrow{mvL0}$ and $\overrightarrow{mvL1}$ are calculated as follows:

$$\overrightarrow{mvL0} = \frac{tb}{td} \times \overrightarrow{mvCol}$$

-continued $$\overrightarrow{mvL1} = \frac{(tb-td)}{td} \times \overrightarrow{mvCol},$$

wherein $\overrightarrow{mvCol}$ represents the motion vector of a macroblock 610, which is a co-located macroblock corresponding to the mode macroblock 608, located in the reference picture 606 of the reference picture list 1, tb represents a distance between the picture 602 and the reference picture 604, and td represents a distance between the reference picture 604 and the reference picture 606.

In this case, the macroblock 610 can be used to calculate the two motion vectors $\overrightarrow{mvL0}$ and $\overrightarrow{mvL1}$ (i.e., calculates the motion vector information associated with the direct prediction mode macroblock 608). As such, when the reference picture 606 of the reference picture list 1 undergoes decoding, unnecessary motion vector information associated with the macroblock 610 may be further discarded based on the reference picture list 0 and 1 of the reference picture 606.

During operation, the ITU-T H.264 standard specifies restrictions on the way that motion vector information may be used for various level indications and profiles. Specifically, the set of constraints may carry multiple syntax elements in the video bitstream 108 for use by the video decoding apparatus 10. According to this illustrated embodiment, the set of constraints includes a direct_8×8_inference flag which is indicative of a motion vector segmentation for a macroblock in the video bitstream 108. In this embodiment, when the direct_8×8_inference flag of a picture is set to 1, it means that the motion vector information associated with some 4×4 sub-macroblock partitions in marcoblock(s) within this picture can be discarded and not to be stored into the memory 106, for direct prediction marcoblock(s) of succeeding picture(s). When the direct_8×8_inference flag of a picture is set to 0, it means that the motion vector information associated with the all 4×4 sub-macroblock partitions are necessary to be stored into the memory 106.

According to this embodiment, the direct_8×8_inference flag may be used to represent the motion vector segmentation and motion vector information associated within the macroblock 20. In detail, when the direct_8×8_inference flag is determined to be 0, all of the motion vector information associated with the 16 4×4 sub-macroblock partitions 202A to 202P may be sequentially stored into the memory 106 for later use by the video decoding apparatus 10. Meanwhile, when the direct_8×8_inference flag is determined to be 1, only the motion vector information associated with the eight 4×4 sub-macroblock partitions may be stored into the memory 106. That is, only the motion vector information associated with 4×4 sub-macroblock partitions 202A, 202D, 202E, 202H, 202I, 202L, 202M and 202P within the macroblock 20 may be stored. As such, the required memory storage capacity is substantially reduced, thereby increasing available transmission bandwidth. In one embodiment, when the direct_8×8_inference flag is determined to be 1, only the motion vector information associated with the 4×4 sub-macroblock partitions 202A, 202D, 202E, 202H, 202I, 202L, 202M and 202P may be stored into the memory 106. As a result, when the direct_8×8_inference flag is determined to be 1, less storage space and less transmission bandwidth may be consumed due to less motion vector information.

Figure 4:
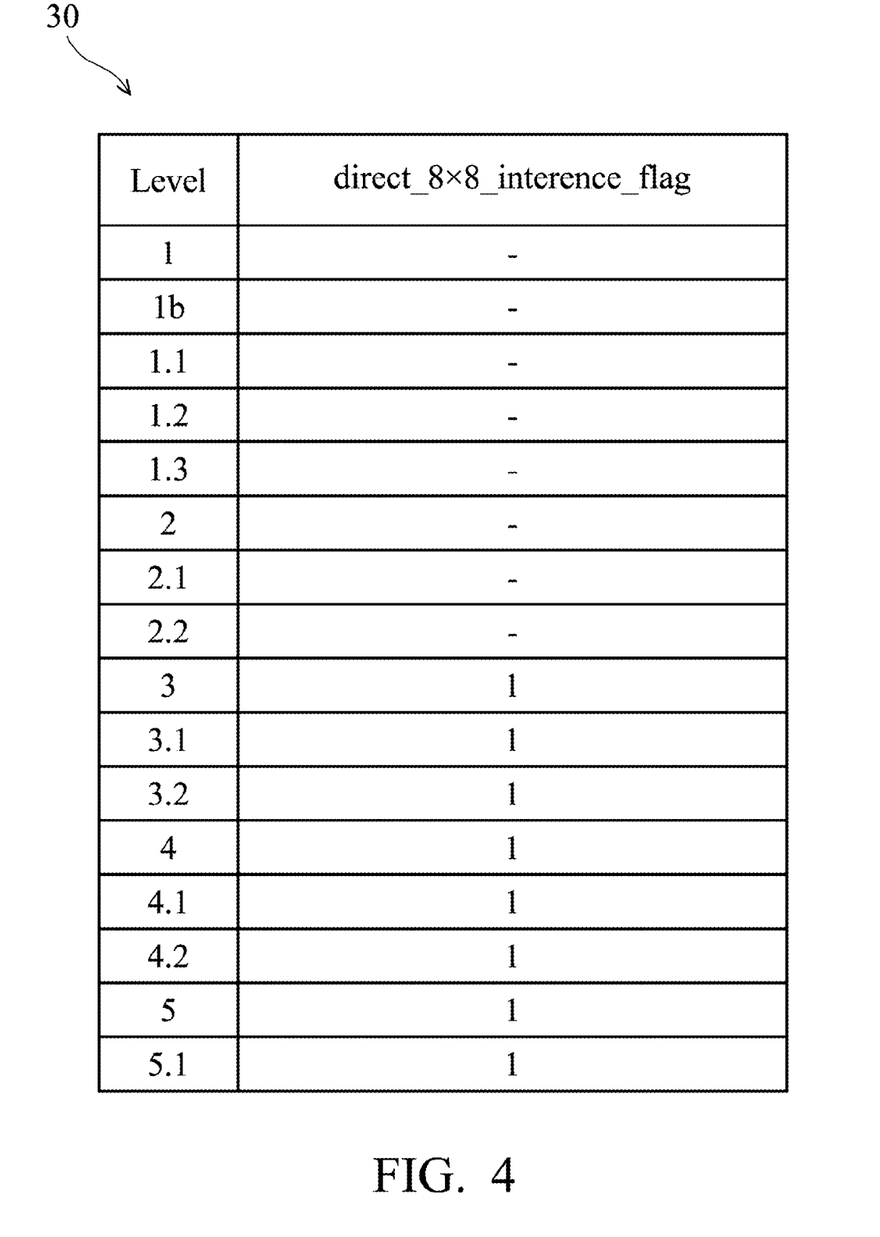
FIG. 4 is a table illustrating the limits for each level according to an embodiment.

In some embodiments, unnecessary motion vector information associated with the macroblock 610 can also be discarded based on the information associated with the direct_8×8_inference flag, for example, a target resolution level of the picture(s). FIG. 4 is a table 30 illustrating relationship between the target resolution levels and the direct_8×8_inference flag of picture(s) according to an embodiment. As shown in FIG. 4, the direct_8×8_inference flag is set to 1, when the level indication exceeds (i.e., is higher than or equal to) Level 3 as defined in the ITU-T H.264 standard. On the contrary, when the level indication is lower than Level 3 as defined in the ITU-T H.264 standard, the direct_8×8_inference flag is marked "−" to denote the absence of a corresponding limit, instead of being set to 1. Thus, in some embodiments, whether the direct_8×8_inference flag is set to 1 can also be determined by the level indication. In this case, the calculator 104 determines whether the level indication exceeds Level 3 as defined in the ITU-T H.264 standard. This is because a relatively high level may allow storage of only the motion vector information associated with the eight 4×4 sub-macroblock partitions, such as 202A, 202D, 202E, 202H, 202I, 202L, 202M and 202P as shown in FIG. 2, for the video bitstream 108. As a result, when the level indication exceeds the predetermined level, less storage space and less transmission bandwidth may be consumed due to less motion vector information.

Figure 5:
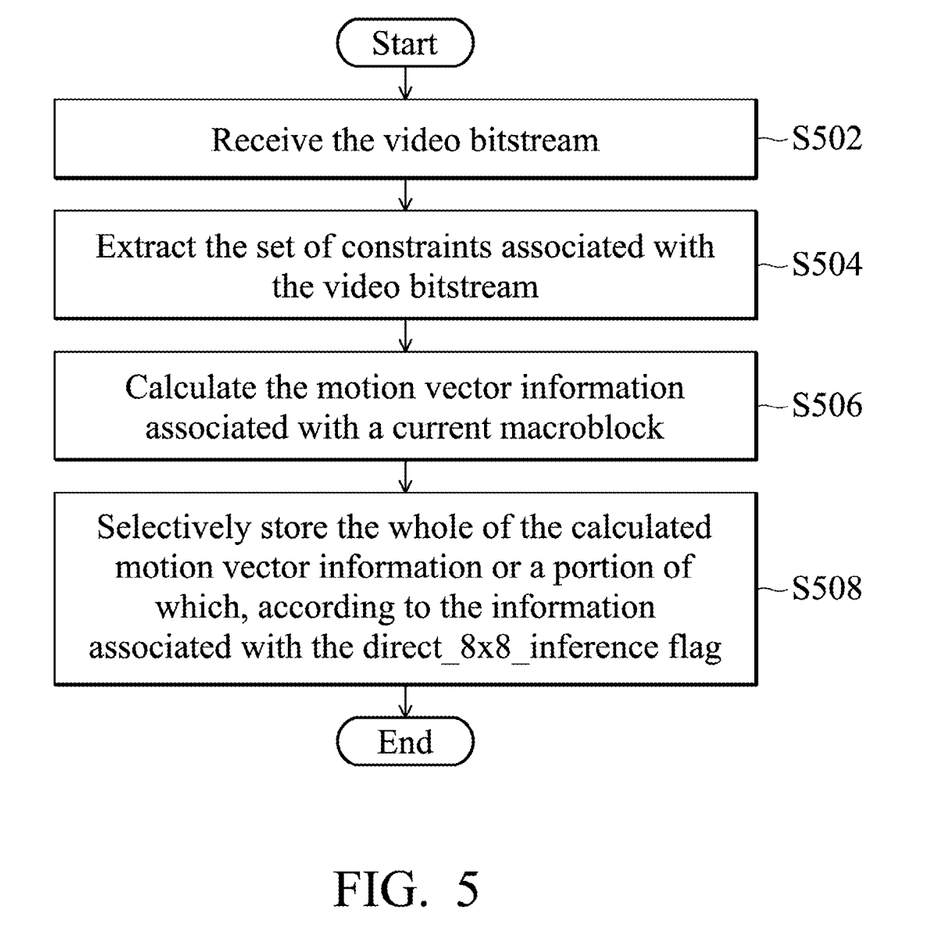
FIG. 5 is a flowchart illustrating a method of storing motion vector information according to an embodiment.

FIG. 5 is a flowchart illustrating a method of storing motion vector information according to an embodiment.

Referring to FIGS. 1, 2 and 3, the bitstream parser 102 receives the video bitstream 108, which is compliant with the ITU-T H.264 standard (step S502). Next, the bitstream parser 102 extracts the set of constraints having multiple syntax elements associated with the video bitstream 108 (step S504). Note that the set of constraints is defined in the header information of the video bitstream 108, and has the information associated with the direct_8×8_inference flag. In some embodiments, the information can be the direct_8×8_inference flag itself and/or the level indication, but is not limited thereto.

Further, the calculator 104 calculates the motion vector information associated with a current marcoblock, e.g., a macroblock 20 as shown in FIG. 2 (step S506). Then, the calculator 104 selectively stores the whole of the calculated motion vector information or a portion of which, according to the information associated with the direct_8×8_inference flag (step S508).

According to an embodiment, it is then determined whether the direct_8×8_inference flag is available. From the aforementioned description, the direct_8×8_inference flag may indicate a presentation of the motion vector segmentation for the macroblock 20 as shown in FIG. 2. When the direct_8×8_inference flag is available, it is further determined whether the value of the direct_8×8_inference flag is equal (or set) to 1.

According to one embodiment, if the direct_8×8_inference flag is equal to 1, the calculator 104 only obtains and stores the motion vector information associated with the eight 4×4 sub-macroblock partitions of the video bitstream 108, such as 202A, 202D, 202E, 202H, 202I, 202L, 202M and 202P as shown in FIG. 2 into the memory 106. Otherwise, it is necessary to store the motion vector information associated with the 16 4×4 sub-macroblock partitions 202A to 202P (i.e., the all 4×4 sub-macroblock partitions) into the memory 106. As a result, when the direct_8×8_inference flag is equal to 1, less storage space and less transmission bandwidth may be consumed due to less motion vector information.

According to another embodiment, when the direct_8×8_inference flag is unavailable, it is further determined whether the level indication obtained from the set of constraints exceeds a predetermined level, such as Level 3 defined in the ITU-T H.264 standard. Similarly, only the motion vector information associated with the eight 4×4 sub-macroblock partitions of the video bitstream 108, such as 202A, 202D, 202E, 202H, 2021, 202L, 202M and 202P as shown in FIG. 2 may be stored into the memory 106 when the level indication exceeds the predetermined level. Otherwise, the calculator 104 stores all of the 16 4×4 sub-macroblock partitions 202A to 202P into the memory 106. As a result, when the level indication exceeds the predetermined level, less storage space and less transmission bandwidth may be consumed due to less motion vector information.

Figure 6:
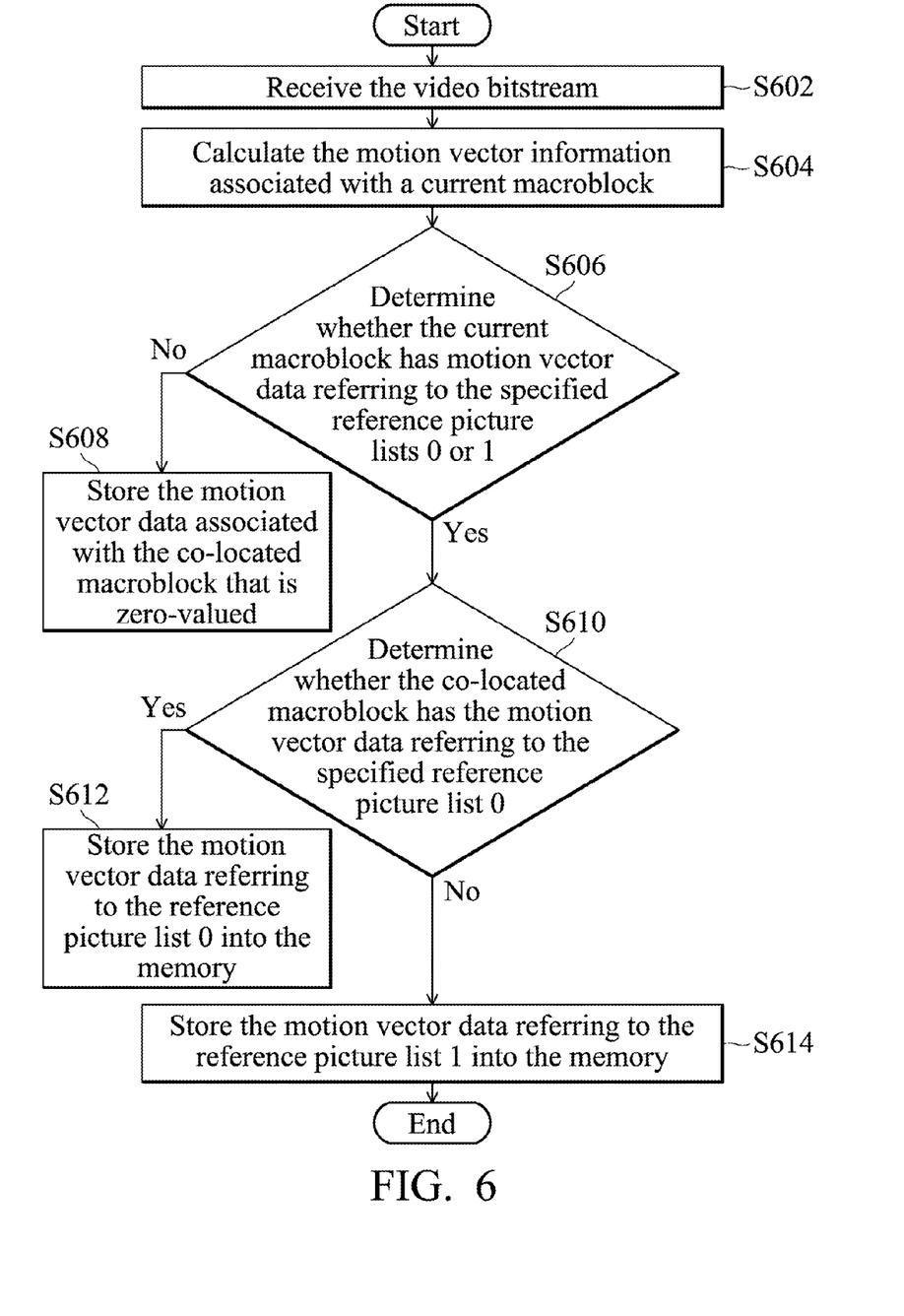
FIG. 6 is a flowchart illustrating another method of storing motion vector information according to an embodiment.

The present invention also provides another method of storing motion vector information for consuming less storage space and less transmission bandwidth. FIG. 6 is a flowchart illustrating a method of storing motion vector information according to an embodiment.

As shown in FIGS. 1, 3 and 6, the bitstream parser 102 receives the video bitstream 108, which is compliant with the ITU-T H.264 standard (step S602). From the aforementioned description, it is noted that the video bitstream 108 includes the picture 602 with the B slice having the direct prediction mode macroblock 608 and the reference picture 606 having the macroblock 610 corresponding to the direct prediction mode macroblock 608.

Then, the calculator 104 calculates the motion vector information associated with a current marcoblock, e.g., the macroblock 610 of the reference picture 606 as shown in FIG. 3 (step S604) For example, the motion vector information may have motion vector data referring to the specified reference picture lists 0 or 1. Next, a determination is made to ascertain whether the reference picture lists 0 and 1 specified for the macroblock 610 of the reference picture 606 is available. That is, the calculator 104 determines whether the macroblock 610 of the reference picture 606 has motion vector data referring to the specified reference picture lists 0 or 1 (step S606).

According to one embodiment, it is assumed that the macroblock 610 is in the intra mode, i.e., the macroblock 610 is an intra-frame prediction macroblock. In this case, the macroblock 610 does not have the motion vector data referring to the specified reference picture lists 0 and 1. Thus, the motion vector information associated with the macroblock 610 are set to zero and stored in the memory 106 (step S608).

Then, it is determined whether the macroblock 610 has the motion vector data referring to the specified reference picture list 0 (step S610).

When the macroblock 610 has the motion vector data referring to the specified reference picture list 0, the calculator 104 then stores the motion vector data referring to the reference picture list 0 into the memory 106, regardless of the motion vector data referring to the specified reference picture list 1 (step S612). Otherwise, the calculator 104 stores the motion vector data referring to the reference picture list 1 into the memory 106 (step S614). Thus, the motion vector information associated with direct prediction mode macroblock 608 is calculated based on the motion vector data associated with the macroblock 610 that was stored in the memory 106. According to this embodiment, in steps S612 and S614, only half of the motion vector data referring to the reference picture list 0 or the reference picture list 1 is required to be stored. As a result, less storage space and less transmission bandwidth may be consumed due to less motion vector data. Any alternative design without departing from the spirit of the present invention falls within the scope of the present invention For example, the method shown in FIG. 6 can be modified to determine whether the macroblock 610 has the motion vector data referring to the specified reference picture list 0 first and then determine whether the macroblock 610 has the motion vector data referring to the specified reference picture list 1 if it does not have motion vector data referring the specified reference picture list 0. Otherwise, the calculator 104 determines the macroblock 610 does not have the motion vector data referring to the specified reference picture lists 0 and 1. Accordingly, corresponding steps 608, 612, and 614 are performed in response to the determination result. As a person skilled in the art can readily understand how to perform the storing steps after reading above paragraphs, further description is omitted here for brevity.

In one embodiment, the motion vector information storing method shown in FIG. 6 can also be combined with the method discussed in FIG. 5 to further reduce the required memory storage capacity and bandwidth. In this embodiment, the bitstream parser 102 would extract the set of constraints having multiple syntax elements associated with the video bitstream 108 before the step S606. Note that the set of constraints is defined in the header information of the video bitstream 108, and has the information associated with the direct_8×8_inference flag. For example, the information can be the direct_8×8_inference flag itself and/or the level indication, but is not limited thereto.

When the direct_8×8_inference flag is available, the calculator 104 further determines whether the value of the direct_8×8_inference flag is equal to 1. If the direct_8×8_inference flag is equal to 1, in step S608, S610 or S614, the motion vector data stored by the calculator 104 is only associated with the eight 4×4 sub-macroblock partitions of the video bitstream 108, such as 202A, 202D, 202E, 202H, 2021, 202L, 202M and 202P as shown in FIG. 2. Otherwise, the motion vector data stored by the calculator 104 is associated with the 16 4×4 sub-macroblock partitions 202A to 202P (i.e., the all 4×4 sub-macroblock partitions), in step S608, S610 or S614. As a result, when the direct_8×8_inference flag is equal to 1, storage space and transmission bandwidth may be further reduced due to less motion vector information.

According to another embodiment, when the level indication obtained from the set of constraints is available, the calculator 104 further determines whether the level indication exceeds a predetermined level, such as Level 3 defined in the ITU-T H.264 standard. In step S608, S610 or S614, the motion vector data stored by the calculator 104 is only associated with the eight 4×4 sub-macroblock partitions of the video bitstream 108, such as 202A, 202D, 202E, 202H, 2021, 202L, 202M and 202P as shown in FIG. 2, if the level indication exceeds the predetermined level. Otherwise, the motion vector data stored by the calculator 104 is associated with all of the 16 4×4 sub-macroblock partitions 202A to 202P. As a result, when the level indication exceeds the predetermined level, storage space and transmission bandwidth may be further reduced due to less motion vector information.

Figure 7:
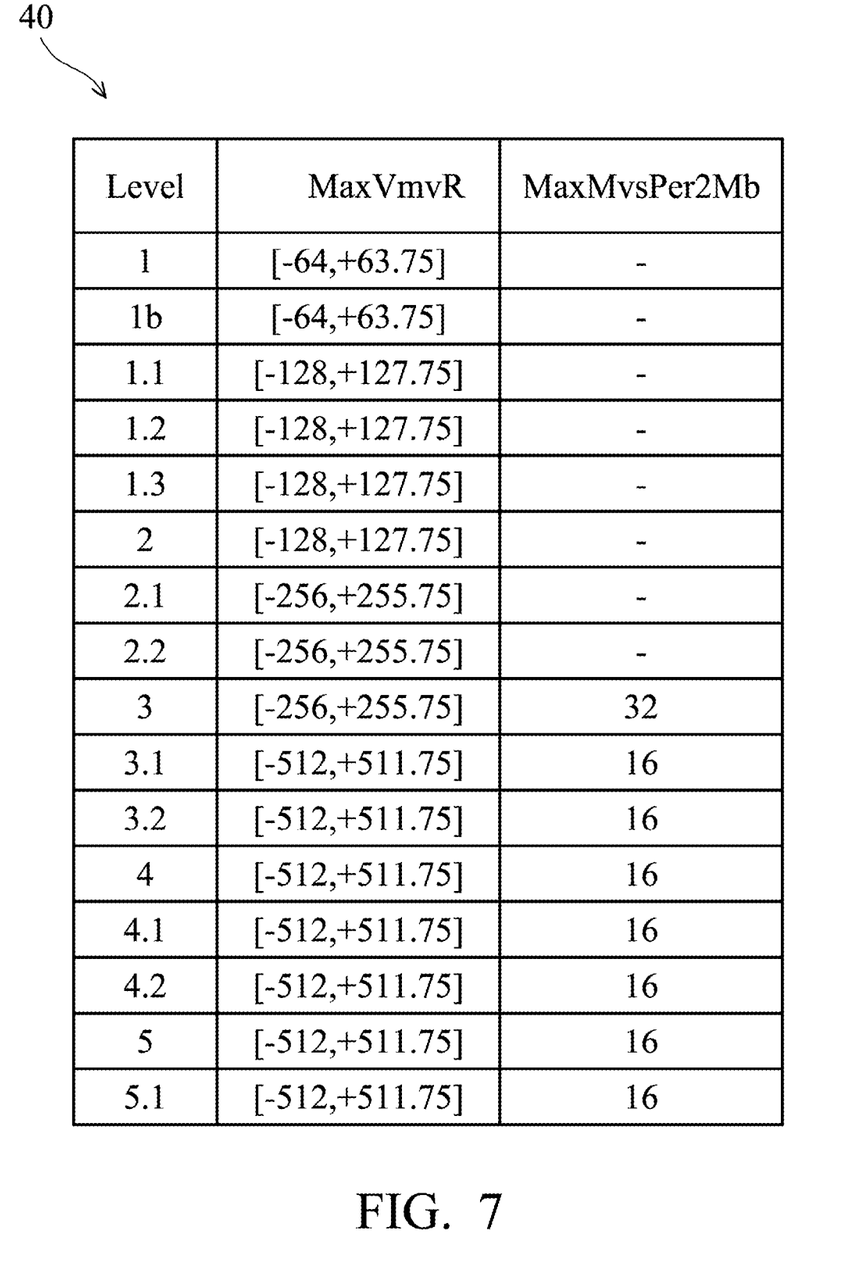
FIG. 7 is another table illustrating the limits for each level according to an embodiment.

From the aforementioned embodiments, it is shown that the level indication may be used to reduce required memory storage capacity. In addition to the level indication, the ITU-T H.264 standard also provides other constraints specified for reducing required memory storage capacity, as shown in FIG. 7. That is, the storage space required for storing the necessary motion vector information may be allocated from the memory 106 in advance according to the level indication or other available syntax elements.

FIG. 7 is a table 40 illustrating the limits for each level according to an embodiment. Entries marked "-" in FIG. 4 denote the absence of a corresponding limit.

As shown in FIG. 7, a syntax element of MaxMvsPer2Mb specified in the table 40 is provided for indicating a maximum number of motion vectors required to be stored for two consecutive macroblocks of a picture included in the video bitstream 108. For example, assume that the macroblock 20 as shown in FIG. 2 and its neighboring macroblock (not shown) are respectively partitioned into 16 4×4 sub-macroblock partitions and each sub-macroblock partition has its own motion vector information. When the syntax element of MaxMvsPer2Mb is set to 32, it means that a maximum number of motion vectors required to be stored for two consecutive macroblocks of a picture is 32. When the syntax element of MaxMvsPer2Mb is set to 16, it means that a maximum number of motion vectors required to be stored for two consecutive macroblocks of a picture is 16. Obviously, it is not necessary to allocate a memory to store motion vector information by 32 motion vectors per marcoblock, when the syntax element of MaxMvsPer2Mb is set to 16. In view of this, the calculator 14 can allocate memories with difference memory sizes for storing motion vector information according to the syntax element of MaxMvsPer2Mb. As such, the required memory storage capacity is substantially reduced, thereby increasing available transmission bandwidth.

Further, as shown table 40 of FIG. 7, when the target resolution level of the picture(s) is higher than 3, the syntax element of MaxMvsPer2Mb is set to 16, and when the target resolution level of the picture(s) is equal to 3, the syntax element of MaxMvsPer2Mb is set to 32. In addition, when the level indication is lower than Level 3 as defined in the ITU-T H.264 standard, the syntax element of MaxMvsPer2Mb is marked "–" to denote the absence of a corresponding limit, instead of being set to 32 or 16. Thus, in some embodiments, whether the syntax element of MaxMvsPer2Mb is set to 16 can also be determined by the level indication. In this case, the calculator 104 determines whether the level indication is above or higher than a predetermined level, such as Level 3 as defined in the ITU-T H.264 standard. This is because a relatively high level may allow less storage of motion vector vectors associated with each macroblock. As a result, when the level indication is higher than the predetermined level, less storage space and less transmission bandwidth may be consumed due to less motion vectors. The process of reducing required memory storage capacity for storing the motion vector information and allocating corresponding storage space is described in more detail in the following description.

Figure 8:
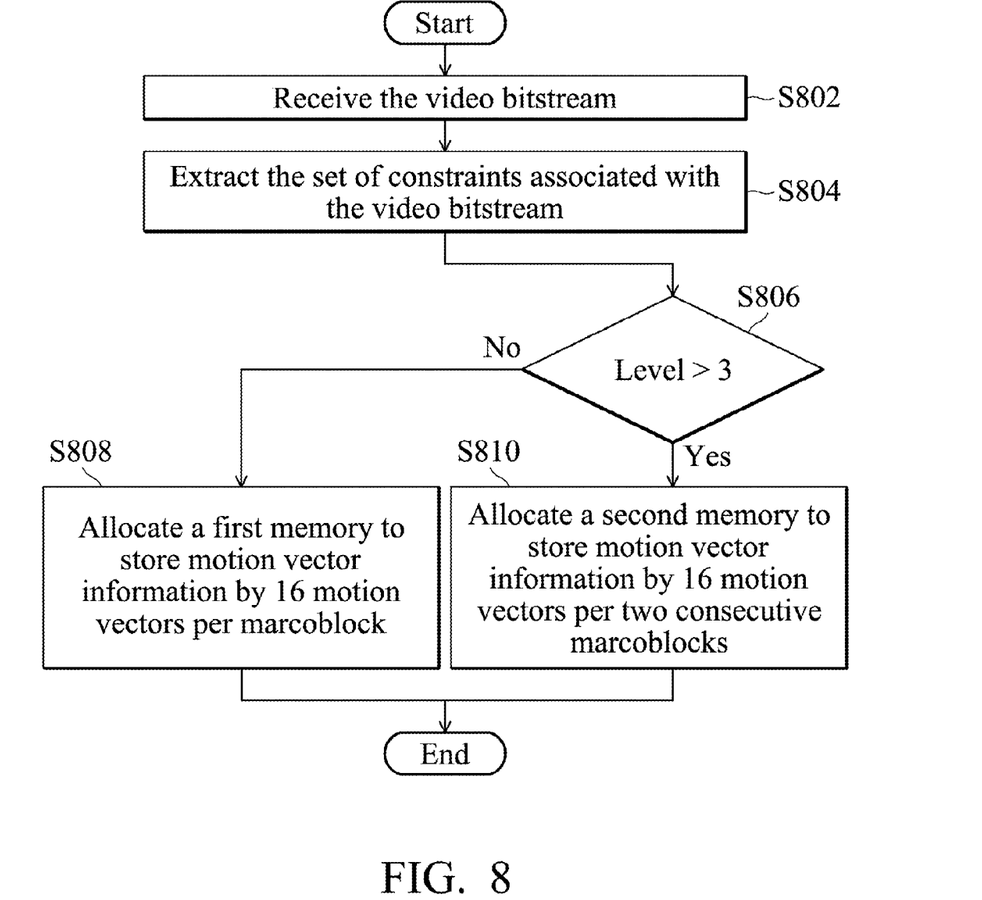
FIG. 8 is a flowchart illustrating a memory allocation method for storing motion vector information according to an embodiment.

Referring to FIGS. 1 and 8, upon starting the memory allocation method, the bitstream parser 102 first receives the video bitstream 108, which is compliant with the ITU-T H.264 standard (step S802). Similarly, the bitstream parser 102 then extracts the set of constraints having multiple syntax elements associated with the video bitstream 108 (step S804). It is noted that the set of constraints is defined in the header information of the video bitstream 108. It should be noted that the memory allocation method is suitable for all profiles of the video bitstream 108 except the extended profile.

Afterwards, the calculator 104 determines whether the level indication in the set of constraints is higher than a predetermined level, such as Level 3 as shown in FIG. 7 (step S806). According to one embodiment, if the level indication is below (i.e., lower than) or equal to 3, the calculator 104 allocates a first memory to store motion vector information, by 16 motion vectors per marcoblock (step S808). Assume that the picture (i.e., frame) has a target resolution level lower than 3 and its total number of macroblocks is 1620. Then, the calculator 104 calculates a first memory size for storing motion information of a picture by 32 motion vectors per two consecutive macroblocks. If each motion vector has 4 bytes, the first memory size for example, be 1620/2*32*4=103680 bytes. Thus, the calculator 104 allocates the first memory of 103680 bytes to store motion vector information for a picture.

On the contrary, if the level indication is above or higher than 3, the calculator 104 allocates a second memory to store motion vector information for later use, by 16 motion vectors per two consecutive macroblocks (step S810). For example, assume that a picture has a target resolution level higher than 3 and its total number of macroblocks is 8160. The calculator 104 then calculates a second memory size for storing motion information of one picture by 16 motion vectors per two consecutive macroblocks. The second memory size can, for example, be 8160/2*16*4=261120 bytes. Thus, the calculator 104 allocates the second memory of 261120 bytes to store motion vector information for a picture.

If the second memory is still allocated by 32 motion vectors per two consecutive marcoblock as conventional methods, a memory of 1044480 bytes (e.g., a third memory size) would be allocated to store motion vector information for one picture. Namely, the third memory size is 4 times of the second memory size. However, the memory with 783360 bytes is not necessary, because each two consecutive macroblocks can have 16 motion vectors at most when the syntax element of MaxMvsPer2Mb is set to 16. Thus, compared with convention methods, allocating the second memory by 16 motion vectors per two consecutive marcoblocks in the step S810 saves three quarters of memory storage space. As a result, when the level indication is higher than 3, less storage space and less transmission bandwidth may be consumed due to less motion vector information.

From the aforementioned embodiments, it is shown that only the motion vector information associated with the eight 4×4 sub-macroblock partitions within one marcoblock is required to be stored into the memory 106 when the direct_8×8_inference flag is set to 1, instead of storing all of the motion vector information associated with the 16 4×4 sub-macroblock partitions. Obviously, it is not necessary to allocate a memory to store motion vector information by 16 motion vectors per marcoblock, when when the direct_8×8_inference flag is set to 1. In view of this, the calculator 14 can allocate memories with difference memory sizes for storing motion vectors according to the direct_8×8_inference flag. As such, the required memory storage capacity is substantially reduced, thereby increasing available transmission bandwidth.

As shown table 30 of FIG. 4, when the target resolution level of the picture(s) exceeds 3 (i.e., Level 3 as defined in the ITU-T H.264 standard), the direct_8×8_inference flag is set to 1. On the contrary, when the target resolution level of the picture(s) is below or smaller than 3, the direct_8×8_inference flag is marked "–" to denote the absence of a corresponding limit, instead of being set to 1. Thus, in some embodiments, whether the direct_8×8_inference flag is set to 1 can also be determined by the level indication (i.e., the target resolution level). In this case, the calculator 104 determines whether the level indication exceeds a predetermined level, such as Level 3 as defined in the ITU-T H.264 standard. This is because a relatively high level may allow half storage of motion vector vectors associated with each macroblock. As a result, when the level indication exceeds a predetermined level, less storage space and less transmission bandwidth may be consumed due to less motion vectors.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method of storing motion vector information, comprising:
   receiving a video bitstream;
   calculating motion vector information associated with a current macroblock of a first picture in the video bitstream;
   determining whether the motion vector information associated with the current macroblock has motion vector data referring to a reference picture list 0 or a reference picture list 1; and
   storing only the motion vector data referring to the reference picture list 0, when the motion vector information associated with the current macroblock has the motion vector data referring to the reference picture list 0; and
   storing only the motion vector data referring to the reference picture list 1, when the motion vector information associated with the current macroblock does not have the motion vector data referring to the reference picture list 0 but has the motion vector data referring to the reference picture list 1, wherein the stored motion vector data is used for a direct prediction mode macroblock of later pictures in the video bitstream.

2. The method as claimed in claim 1, further comprising storing motion vector information associated with the current macroblock that is zero-valued, when the motion vector information associated with the current macroblock does not have the motion vector data referring to the reference picture list 0 and the reference picture list 1.

3. The method as claimed in claim 1, wherein the current macroblock is a co-located macroblock corresponding to the direct prediction mode macroblock.

4. A video decoding apparatus, comprising:
   a bitstream parser for receiving a video bitstream;
   a memory; and
   a calculator coupled to the bitstream parser, for calculating motion vector information associated with a current macroblock of a first picture in the video bitstream and determining whether the motion vector information associated with the current macroblock has motion vector data referring to a reference picture list 0 or a reference picture list 1;
   wherein the calculator stores only the motion vector data referring to the reference picture list 0 in the memory when the motion vector information associated with the current macroblock has the motion vector data referring to the reference picture list 0; and the calculator stores only the motion vector data referring to the reference picture list 1 in the memory when the motion vector information associated with the current macroblock does not have the motion vector data referring to the reference picture list 0 but has the motion vector data referring to the reference picture list 1, wherein the stored motion vector data is used for a direct prediction mode macroblock of later pictures in the video bitstream.

5. The video decoding apparatus as claimed in claim 4, wherein the calculator further stores the motion vector information associated with the current macroblock that is zero-valued in the memory, when the motion vector information associated with the current macroblock does not have the motion vector data referring to the reference picture list 0 and the reference picture list 1.

6. The video decoding apparatus as claimed in claim 4, wherein the current macroblock is a co-located macroblock corresponding to the direct prediction mode macroblock.

* * * * *